US010568266B2

(12) United States Patent
Vandeven et al.

(10) Patent No.: US 10,568,266 B2
(45) Date of Patent: Feb. 25, 2020

(54) SELF-CONTAINED COMBINE DRAPER WING LEVELER (71) Applicant: Deere & Company, Moline, IL (US)

(72) Inventors: Michael L. Vandeven, Princeton, IA (US); Paul D. Marvin, DeWitt, IA (US)

(73) Assignee: DEERE & COMPANY, Moline, IL (US)

( * ) Notice: Subject to any disclaimer, the term of this patent is extended or adjusted under 35 U.S.C. 154(b) by 198 days.

(21) Appl. No.: 15/785,831

(22) Filed: Oct. 17, 2017

(65) Prior Publication Data
US 2019/0110404 A1 Apr. 18, 2019

(51) Int. Cl.
A01D 67/00 (2006.01)
A01D 69/03 (2006.01)
(Continued)

(52) U.S. Cl.
CPC .............. *A01D 67/00* (2013.01); *A01D 34/04* (2013.01); *A01D 61/02* (2013.01); *A01D 69/03* (2013.01)

(58) Field of Classification Search
CPC ............ A01B 73/00–067; A01D 34/04; A01D 41/06; A01D 41/14; A01D 41/141;
(Continued)

(56) References Cited

U.S. PATENT DOCUMENTS 2,608,041 A    8/1952  Schoenrock
3,468,107 A *  9/1969  Van Der Lely ...... A01D 41/144
                                                       56/11.9
(Continued)

FOREIGN PATENT DOCUMENTS

EP    0750833       1/1997
EP    2842407 A1   3/2015
(Continued)

OTHER PUBLICATIONS

United States Patent Office Action for U.S. Appl. No. 15/730,442 dated Dec. 20, 2018 (18 pages).
European Patent Office Search Report for Application No. 182004093 dated Mar. 15, 2019 (7 pages).
European Patent Office Search Report for Application No. 18200436.6 dated Mar. 19, 2019 (9 pages).
(Continued)

*Primary Examiner* — Robert E Pezzuto
*Assistant Examiner* — Adam J Behrens
(74) *Attorney, Agent, or Firm* — Michael Best & Friedrich LLP (57) ABSTRACT A draper header for a combine, the draper header including an attachment frame adapted for attachment to the combine. A harvesting assembly includes a plurality of sections and a plurality of belts operable to feed crop material into the combine. The draper header is operable in a first mode that allows the plurality of sections to float relative to the attachment frame for ground following during harvesting, and in a second mode in which the attachment frame is raised to lift and support the harvesting assembly to be spaced above the ground. A hydraulic leveling system includes at least one leveling actuator. A valve is operable in response to the movement of the draper header into the second mode to direct pressurized hydraulic fluid into the at least one leveling actuator to automatically level the plurality of sections of the harvesting assembly when in the second mode.

20 Claims, 5 Drawing Sheets (51) Int. Cl.
*A01D 61/02* (2006.01)
*A01D 34/04* (2006.01)

(58) Field of Classification Search
CPC .... A01D 41/144; A01D 41/145; A01D 57/06; A01D 61/02; A01D 67/00; A01D 69/03; A01D 75/002; A01D 75/285; A01D 75/287

See application file for complete search history.

(56) References Cited

U.S. PATENT DOCUMENTS

| | | | |
|---|---|---|---|
| 3,683,601 A | | 8/1972 | Van der Lely |
| 4,487,004 A | * | 12/1984 | Kejr ................ A01D 41/14 56/14.4 |
| 5,464,371 A | | 11/1995 | Honey |
| 5,577,563 A | | 11/1996 | Holen |
| 5,673,543 A | | 10/1997 | Richardson et al. |
| 5,724,798 A | | 3/1998 | Stefl et al. |
| 5,845,472 A | | 12/1998 | Arnold |
| 6,003,615 A | | 12/1999 | Moore |
| 6,202,397 B1 | | 3/2001 | Watts et al. |
| 6,675,568 B2 | * | 1/2004 | Patterson ............ A01D 41/14 56/208 |
| 6,865,871 B2 | | 3/2005 | Patterson et al. |
| 7,168,226 B2 | | 1/2007 | McLean et al. |
| 7,470,180 B2 | | 12/2008 | Honey |
| 7,540,130 B2 | | 6/2009 | Coers et al. |
| 7,587,885 B2 | | 9/2009 | Tippery et al. |
| 7,802,417 B2 | | 9/2010 | Sauerwein et al. |
| 7,918,076 B2 | | 4/2011 | Talbot |
| 7,992,372 B1 | | 8/2011 | Coers et al. |
| 8,087,224 B1 | * | 1/2012 | Coers ................ A01D 41/144 56/153 |
| 8,281,561 B2 | | 10/2012 | Dow et al. |
| 8,336,280 B2 | | 12/2012 | Lovett et al. |
| 8,393,135 B2 | | 3/2013 | Honas et al. |
| 8,544,250 B2 | | 10/2013 | Lovett et al. |
| 9,072,222 B2 | * | 7/2015 | Bomleny ............ A01D 45/021 |
| 9,144,199 B2 | | 9/2015 | Ritter et al. |
| 9,161,492 B2 | | 10/2015 | Fuechtling |
| 9,198,353 B2 | | 12/2015 | Ritter et al. |
| 9,526,206 B2 | * | 12/2016 | Schulze Ruckamp ................. A01D 41/06 |
| 9,992,924 B2 | | 6/2018 | van Vooren et al. |
| 10,070,575 B2 | | 9/2018 | Wenger et al. |
| 10,299,437 B2 | * | 5/2019 | Farley ................ A01D 75/182 |
| 2002/0035826 A1 | | 3/2002 | Albinger et al. |
| 2003/0074876 A1 | * | 4/2003 | Patterson ............ A01D 41/14 56/257 |
| 2003/0182912 A1 | | 10/2003 | Boll |
| 2003/0226342 A1 | | 12/2003 | Boeckmann et al. |
| 2004/0123575 A1 | | 7/2004 | Rickert |
| 2005/0284124 A1 | | 12/2005 | Patterson et al. |
| 2006/0225900 A1 | | 10/2006 | Kimball |
| 2008/0072560 A1 | * | 3/2008 | Talbot ............. A01D 41/14 56/208 |
| 2008/0161077 A1 | | 7/2008 | Honey |
| 2008/0295473 A1 | * | 12/2008 | Tippery ............ A01D 41/144 56/14.5 |
| 2009/0320431 A1 | | 12/2009 | Puryk et al. |
| 2012/0047866 A1 | | 3/2012 | Fuechtling |
| 2012/0279191 A1 | | 11/2012 | Sauerwein et al. |
| 2013/0097986 A1 | | 4/2013 | Lovett et al. |
| 2014/0033670 A1 | | 2/2014 | Cressoni |
| 2014/0041354 A1 | | 2/2014 | Coon et al. |
| 2015/0013795 A1 | * | 1/2015 | Ritter .................. A01D 41/145 137/596.16 |
| 2015/0373907 A1 | * | 12/2015 | Schulze Ruckamp ...................... A01D 41/16 56/246 |
| 2016/0183462 A1 | | 6/2016 | Magisson et al. |
| 2016/0262301 A1 | | 9/2016 | van Vooren et al. |
| 2016/0360699 A1 | | 12/2016 | Allochis |
| 2017/0094904 A1 | * | 4/2017 | Sudhues ............ A01D 57/20 |
| 2017/0113876 A1 | | 4/2017 | Jager et al. |
| 2017/0223896 A1 | | 8/2017 | Schmid |
| 2017/0251606 A1 | | 9/2017 | Van Overschelde et al. |
| 2017/0367266 A1 | * | 12/2017 | Vandendriessche .................. A01D 41/144 |
| 2018/0035598 A1 | | 2/2018 | Wenger et al. |
| 2018/0070526 A1 | | 3/2018 | Henry |
| 2018/0084724 A1 | | 3/2018 | Fuchtling |
| 2018/0338418 A1 | * | 11/2018 | Ricketts ............ A01D 41/14 |
| 2019/0045709 A1 | | 2/2019 | Schroeder et al. |
| 2019/0053429 A1 | * | 2/2019 | Cook ................ A01D 45/021 |

FOREIGN PATENT DOCUMENTS

| | | |
|---|---|---|
| EP | 3066910 A1 | 9/2016 |
| EP | 3087819 A2 | 11/2016 |

OTHER PUBLICATIONS

European Patent Office Search Report for Application No. 18199247.0 dated Mar. 22, 2019 (7 pages).
United States Patent Office Action for U.S. Appl. No. 15/729,867 dated May 8, 2019 (13 pages).
European Patent Office Search Report for Application No. 18199265.2 dated May 17, 2019 (12 pages).

\* cited by examiner

SELF-CONTAINED COMBINE DRAPER WING LEVELER

BACKGROUND

The disclosure relates to headers for combine harvesters, and more particularly draper headers having separate lateral wings for ground following and draper belts for feeding cut crops into a feeder house.

SUMMARY

The disclosure provides, in one aspect, a draper header for a combine. An attachment frame is adapted for attachment to the combine. A harvesting assembly includes a plurality of sections and a plurality of belts operable to feed crop material into the combine. The draper header is operable in a first mode that allows the plurality of sections to float relative to the attachment frame for ground following during harvesting. The draper header is further operable in a second mode in which the attachment frame is raised to lift and support the harvesting assembly to be spaced above the ground. A hydraulic leveling system includes at least one leveling actuator. A valve is operable in response to the movement of the draper header into the second mode to direct pressurized hydraulic fluid into the at least one leveling actuator to automatically level the plurality of sections of the harvesting assembly when in the second mode.

The disclosure provides, in another aspect, a draper header for a combine. A center section includes an attachment frame adapted for attachment to the combine. The center section operable for feeding crop material in a rearward direction into the combine. First and second wings extend in opposite lateral directions from the center section. The first and second wings comprise respective draper belts drivable by respective hydraulic motors and operable to feed crop material toward the center section. Each of the first and second wings is independently supported relative to the center section by a resilient float element. First and second wing leveling hydraulic cylinders are coupled, respectively, to the first and second wings and operable when energized to exert respective lifting forces to the first and second wings for leveling the first and second wings. A cutterbar is positioned at a forward edge of the draper header across the center section and the first and second wings. The cutterbar is operable to reciprocate for cutting crop material from the ground. A hydraulic circuit includes a pump having an outlet side operatively coupled to the respective hydraulic motors for driving the respective draper belts when the first and second wings engage the ground for harvesting. A valve of the hydraulic circuit is actuable from a first position to a second position, in response to lifting of the first and second wings off the ground, to connect the first and second wing leveling hydraulic cylinders to the outlet side of the pump.

The disclosure provides, in yet another aspect, a method of leveling first and second wings of a harvesting assembly of a combine draper header. The combine is operated with the draper header on the ground and the first and second wings resiliently supported from a center section of the harvesting assembly. The combine is operated to achieve a lifted state of the draper header by lifting the center section off the ground to remove ground support from the first and second wings so that the center section is supported by a stop on an attachment frame that secures the combine draper header to the combine, leaving the first and second wings independently cantilevered from the center section. First and second wing leveling actuators are automatically energized in the lifted state, each operating to exert a lifting force to the respective one of the first and second wings to obtain and maintain a level orientation of both the first and second wings.

Further aspects are set forth in the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the accompanying drawings.

Figure 1:
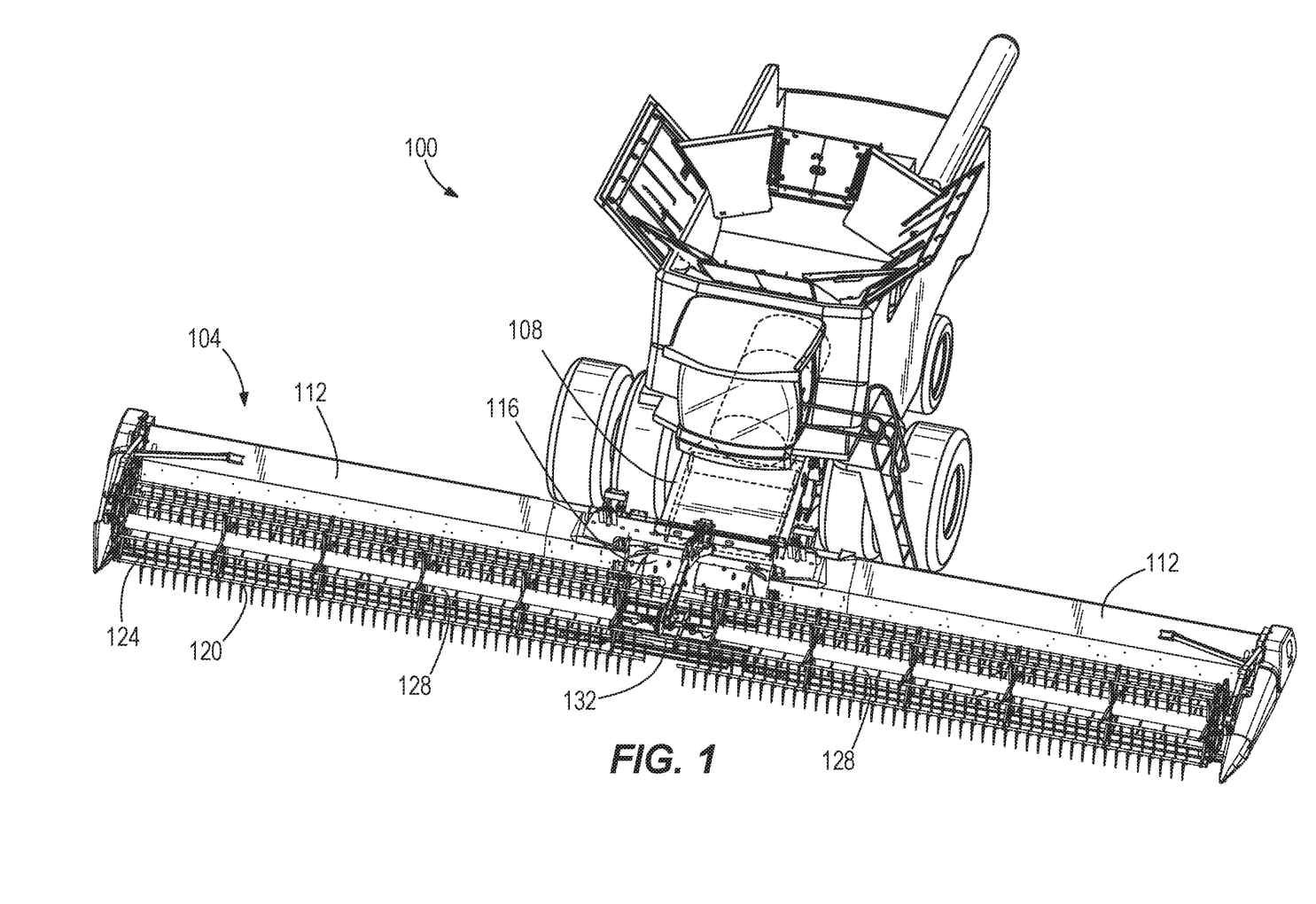
FIG. 1 is a perspective view of a combine harvester including a draper header having a float system according to one embodiment of the present disclosure.

A combine harvester 100 (or simply "combine") is shown in FIG. 1. A removable header 104 is provided at a front end of the combine 100 to cut crops and feed the crops into a housing 108, or "feeder house", of the combine 100 for further harvest processing within the combine 100 (i.e., threshing of the valued crop grains from the plant stalks and separating or cleaning the crop grains from the chaff so that the crop grains alone are harvested). The threshing and separating can be accomplished by any one of a variety of practical mechanisms. The header 104 of the illustrated construction is a flexible header in which first and second wings 112 are movably supported on opposite lateral sides of a center section 116 that attaches the header 104 to the combine housing 108. The header 104 includes a rotatable reel 120 to engage standing crops for delivery to a table of the header 104. A cutterbar 124 at a forward edge of the header 104 operates (e.g., by reciprocating a plurality of overlapping knives) to cut the crop material close to the ground as it is engaged by the reel 120. The header 104 is a draper header in which the table is equipped with endless belts for feeding the cut crop material into the housing 108. For example, each wing 112 includes at least one side draper belt 128 operable to transmit the cut crop material inward toward the center section 116. The center section 116 further includes a feeder draper belt 132 operable, in a rearward direction parallel and opposite to the combine travel direction and perpendicular to the side draper belts 128, for transmitting the cut crop material into the combine housing 108. The center section 116 and wings 112 form a harvesting assembly operable to cut the crop material from the ground and pass it into the combine housing 108. The header 104 additionally includes an attachment frame 118 on the center section 116 and adapted to removably couple the header 104 to the combine housing 108. From the cab of the combine 100, an operator can control various aspects of the operation of the header 104, including raising the header 104 up off the ground at the completion of a harvesting cycle.

Figure 2:
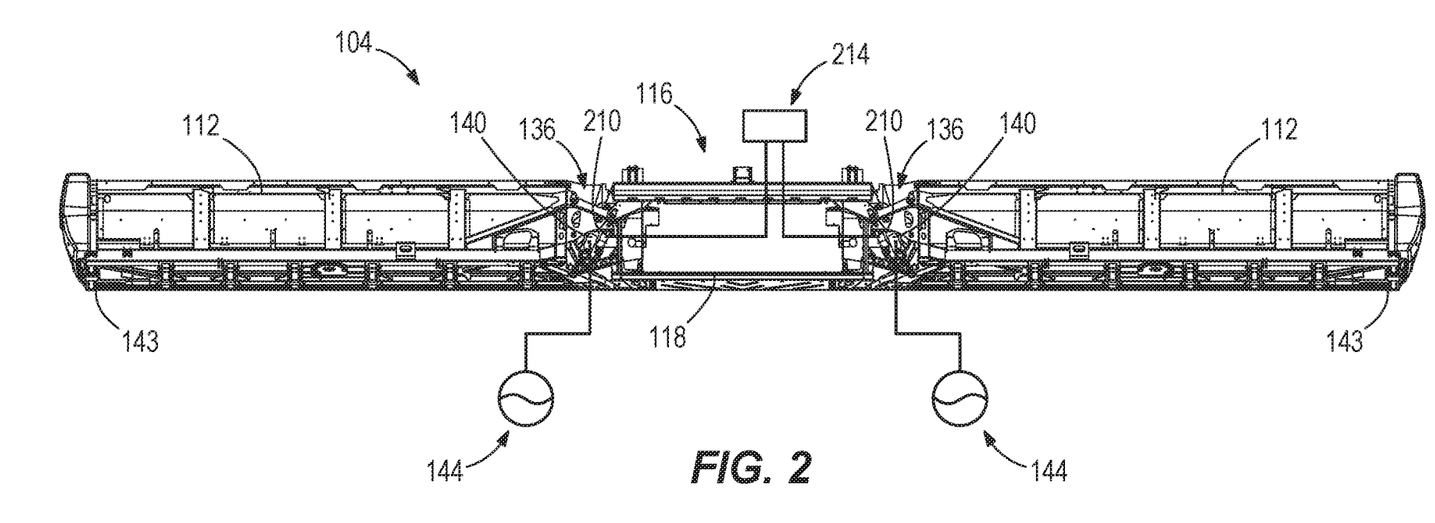
FIG. 2 is a rear view of the draper header of FIG. 1, along with schematically illustrated hydraulic float circuits connected to resilient float elements of the draper header.

Each of the wings 112 is pivotably supported by the center section 116 to allow independent movement of the two wings 112 with respect to the center section 116. In this respect, a respective connection linkage 136 is provided between the center section 116 and each wing 112 to connect the same for pivoting motion. The connection linkages 136 can be provided toward a rearward end of the header 104, and a direct pivot connection may also be established toward the forward end between the center section 116 and each wing 112. The cutterbar 124, which spans both wings 112 and the center section 116 can flex to accommodate the pivoting movement of the wings 112 relative to the center section 116. This header 104 thus allows consistent low cutting of the crop material from the ground, even over uneven ground. Each wing 112 is mostly supported by a float arrangement including at least one resilient float element 140, while a small fraction of the weight of the wing 112 is applied to the ground (e.g., by a gauge wheel and/or skid 143 at the laterally outer end of the wing). Each resilient float element 140 is operable to produce a force output that varies with a position of the wing 112 with respect to the center section 116. However, each of the resilient float elements 140 can be coupled in a manner that allows a relatively constant float force to be applied to the wing 112 while encountering various changes in terrain during harvesting, despite changes in the actual force output of the resilient float element 140. FIG. 2 provides a general overview of the wing float system, which includes two independent float circuits or sub-systems, each of which includes the resilient float element 140 (e.g., a single-acting hydraulic cylinder) coupled via a hydraulic line to an accumulator 144 (e.g., a gas-charged accumulator). Details of the float system and its operation are discussed in further detail below, following additional discussion of the connecting structures between the center section 116 and the wings 112.

Figure 3:
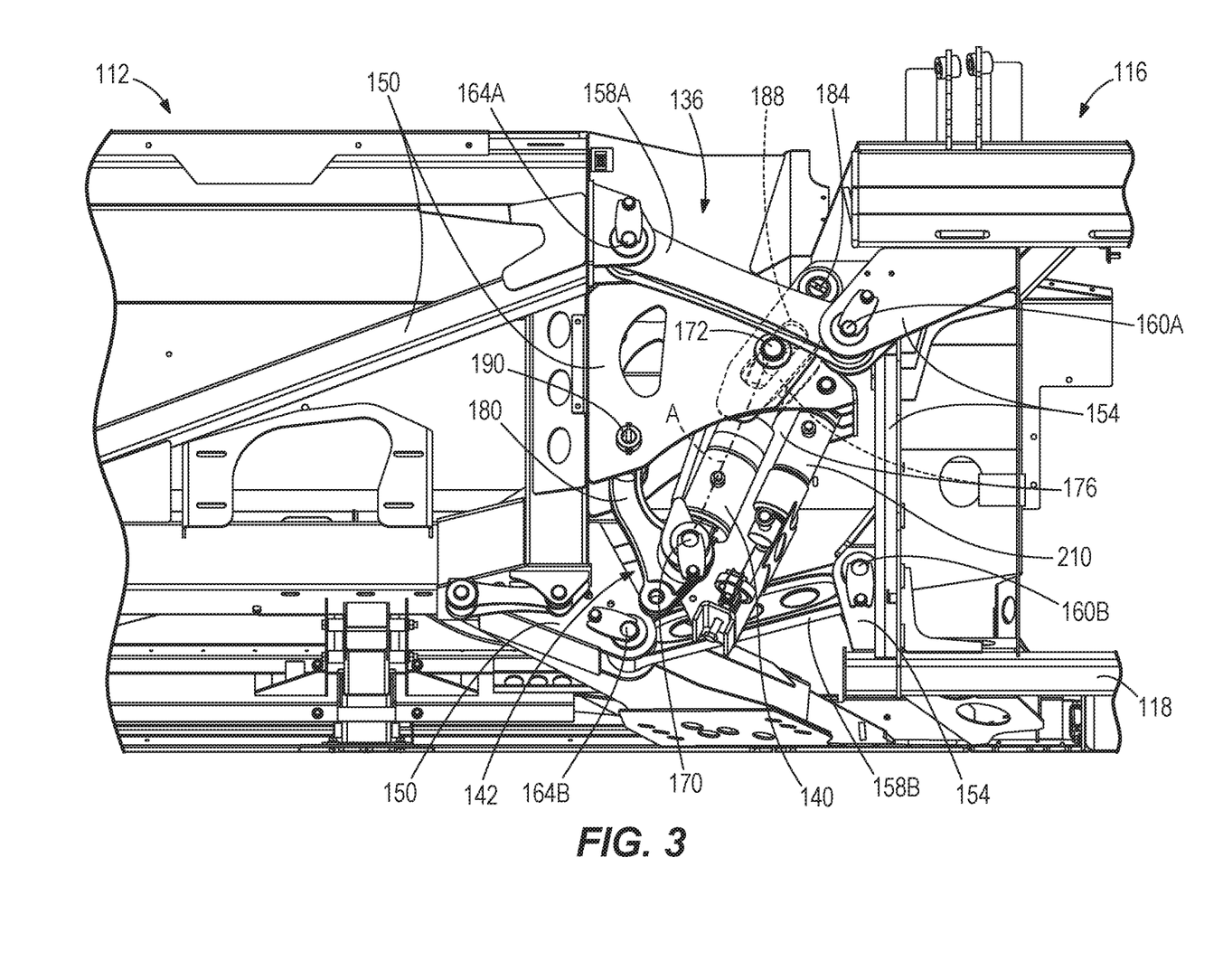
FIG. 3 is a detail view of the draper header shown in FIG. 2, further illustrating a connection linkage and a float linkage provided between a wing and a center section of the draper header. The wing is shown in a downwardly pivoted position.

FIG. 3 illustrates one connection linkage 136 for coupling one of the wings 112 to the center section 116, with the understanding that the other wing 112 is supported by another connection linkage 136, which is a mirror image of the illustrated connection linkage 136 and conforms to the same description. The wing 112 is shown in a downwardly pivoted operational position in FIG. 3. The connection linkage 136 is provided as a four-bar linkage consisting of a frame portion 150 of the wing 112, a frame portion 154 of the center section 116, and two connecting links 158A, 158B therebetween. The two connecting links 158A, 158B are coupled at two respective pivots 160A, 160B on the frame portion 154 of the center section 116 and coupled at two respective pivots 164A, 164B on the frame portion 150 of the wing 112. The float linkage 142 carrying the resilient float element 140 is separately coupled between the frame portions 150, 154. As will become further apparent by the following description, the float linkage 142 passively responds to movement of the wing 112 through the connection linkage 136 to modify the supporting relationship between the resilient float element 140 and the wing 112. By passive, it is meant that it is merely reactive or responsive in a predetermined way, rather than actively or variably controlled.

The resilient float element 140 is extensible to vary in length between a first or lower end 170 and a second or upper end 172. The first and second ends 170, 172 can be provided as pivots similar to those of the connection linkage 136, but are separate and spaced from every one of the pivots 160A, 160B, 164A, 164B of the connecting links 158A, 158B. Further, only one of the first and second ends 170, 172 of the resilient float element 140 is provided in fixed position on either of the frame portions 150, 154 (i.e., the upper end 172 is fixed on the wing frame portion 150). A primary link 176 of the float linkage 142 has a first or lower end pivotably coupled to both the first end 170 of the resilient float element 140 and a secondary link 180 of the float linkage 142. A second or upper end of the primary link 176 is pivotably coupled to an additional pivot, or third pivot 184, on the frame portion 154 of the center section 116. The third pivot 184 is spaced above and laterally outboard (to the wing side) of both of the other pivots 160A, 160B on the frame portion 154. The second end 172 of the resilient float element 140 defines a pivot joint with the frame portion 150 of the wing 112 and the primary link 176, between the first and second ends of the primary link 176 (i.e., between the pivot at the lower end 170 and the third pivot 184 on the frame portion 154). The pivot joint is retained in the illustrated construction within an elongated hole or slot 188 in which the second end 172 of the resilient float element 140, along with the frame portion 150 secured thereto, can traverse lengthwise along a distance between ends of the slot 188. The ends of the slot 188 can function as travel limits (e.g., maintaining each wing 112 in a range of +/−5 degrees from horizontal neutral alignment with the center section 116). The secondary link 180 of the float linkage 142 is pivotably coupled to the first end 170 of the resilient float element 140 and further pivotably coupled to the wing frame portion 150 at an additional pivot, or fourth pivot 190. The fourth pivot 190 lies at a position on the wing frame portion 150 between the two pivots 164A, 164B at which the two connecting links 158A, 158B are coupled.

Although FIG. 3 illustrates the wing 112 in the downwardly pivoted position, it should be understood that the wing 112 is also free to assume a level or neutral orientation with respect to the center section 116, or an upwardly pivoted position. During normal use over uneven ground, both wings 112 will independently float on the center section 116, assuming both upwardly and downwardly pivoted positions of various degrees within the allowable range of motion. The float system, including the resilient float element 140 for each wing 112, provides passive wing floatation that responds to uneven ground conditions naturally, without monitoring or actively adjusting the resilient float element 140. Rather, when a wing 112 encounters an upslope in the ground, a ground-contact portion of the wing 112, such as the gauge wheel or skid 143, is urged upward by the ground. The float system responds automatically to this disturbance by allowing upward deflection of the wing 112. In the case of a hydraulic float system as illustrated, this includes an extension of the hydraulic cylinder provided as the resilient float element 140. The extension increases the fluid volume within the hydraulic cylinder and allows a transfer of additional hydraulic fluid from the associated accumulator 144 into the hydraulic cylinder. The hydraulic fluid pressure, and thus the stored energy, within the resilient float element 140 is thus reduced. However, to avoid exerting a reduced float force to the wing 112 while the wing 112 remains on the upslope, the float linkage 142 may operate automatically in some constructions during the wing movement to compensate for the reduction in stored energy within the resilient float element 140 in order to maintain a relatively constant float force exerted on the wing 112. In other words, the float linkage 142 adjusts the mechanical advantage of the resilient float element 140 to the wing 112 to offset the effect of the stored energy reduction therein, thus subduing a change in an overall wing float force applied to the wing by the resilient float element. This is accomplished through the pivot joint to bring an operative axis A defined by the resilient float element 140 into closer alignment, or into alignment, with the third pivot 184 on the frame portion 154.

Figure 4:
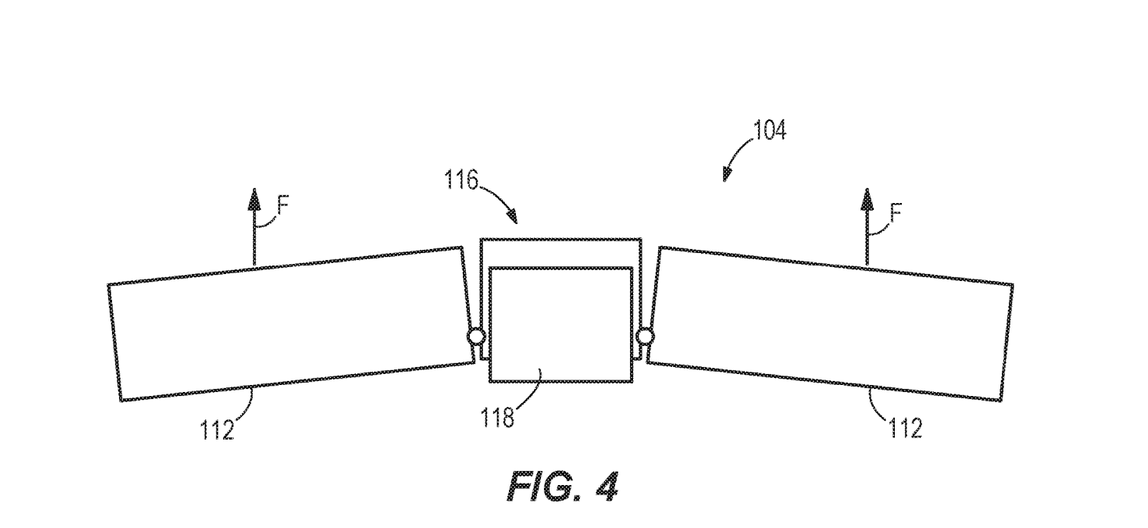
FIG. 4 is a schematic illustration of the draper header showing a droop profile to be automatically corrected when the draper header is raised off the ground.

At the end of a harvesting cycle, the operator in the combine 100 actuates a lifting device (not shown) to raise the header 104 up off of the ground so that the combine 100 can be driven to a starting point of another harvesting cycle or back to a storage location without incurring ground contact. Putting the combine 100 into the lifted state is accomplished by lifting the center section 116 off the ground to remove ground support from the first and second wings 112 so that the center section 116 is supported by a stop 204 on the attachment frame 118, leaving the first and second wings 112 independently cantilevered from the center section 116. This represents a secondary mode of operation as contrasted with the primary or harvesting mode. Because the float system of the header 104 is designed to have a certain amount of weight of each wing 112 supported by the ground during harvesting, the wings 112 will tend to droop down as shown in FIG. 4 when put into the second mode, or lifted state. However, to eliminate such a tendency for the wings 112 to droop, the header 104 is provided with a self-contained leveling system including leveling actuators 210 operable to output upward lifting forces F on each wing 112. In particular, the leveling system can be provided as a hydraulic leveling system including a leveling actuator 210 such as a hydraulic cylinder for each wing 112. The hydraulic leveling system can be hydraulically isolated from the resilient float elements 140. However, the hydraulic leveling system can be provided as a selectively active portion of a hydraulic system 214 that drives the side draper belts 128 and/or other devices within the header 104.

As shown in FIG. 3, each leveling actuator 210 is incorporated into the float linkage 142, being secured between the primary link 176 and the wing frame portion 150. As described in further detail below, supplying the leveling actuator 210 with pressurized fluid causes an extension of the actuator 210, which results in leveling the respective wing 112. Each leveling actuator 210 can have a full stroke limit that corresponds to a level condition between the respective wing 112 and the center section 116. For example, the full stroke limit can be determined by a maximum extensible length as determined by a stop either internal or external with respect to the leveling actuator 210. As such, precision pressure or length control and associated measurements or control strategies are not required for consistently and reliably leveling the wings 112. Rather, the leveling actuators 210 are controllable in binary fashion, as either OFF or ON, and are normally OFF. When OFF, the leveling actuators 210 are not energized, and do not influence the pivot position of the wings 112. When ON, the leveling actuators 210 are energized and force the wings 112 to the level condition. In some constructions, the wings 112 remain resiliently supported by the resilient float elements 140 when the leveling actuators 210 are ON, such that some up/down movement is possible in the presence of outside forces, but the wings 112 generally remain level since the header 104 is lifted off the ground and not subjected to the ground-following forces.

Figure 5:
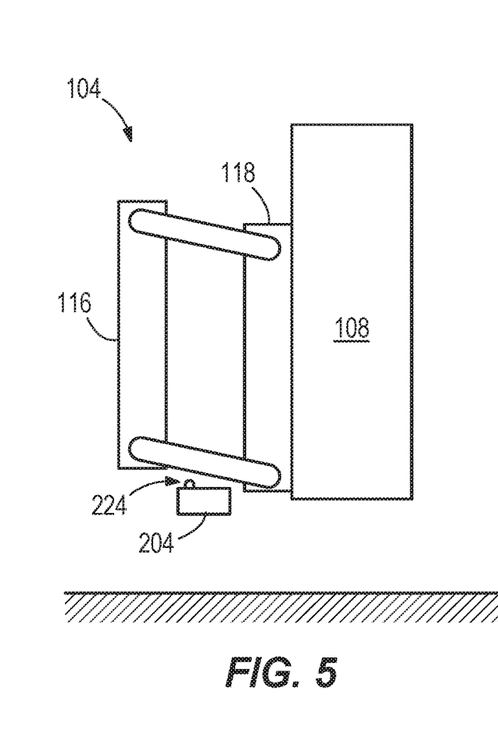
FIG. 5 is schematic side view of the draper header during normal float operation.
Figure 6:
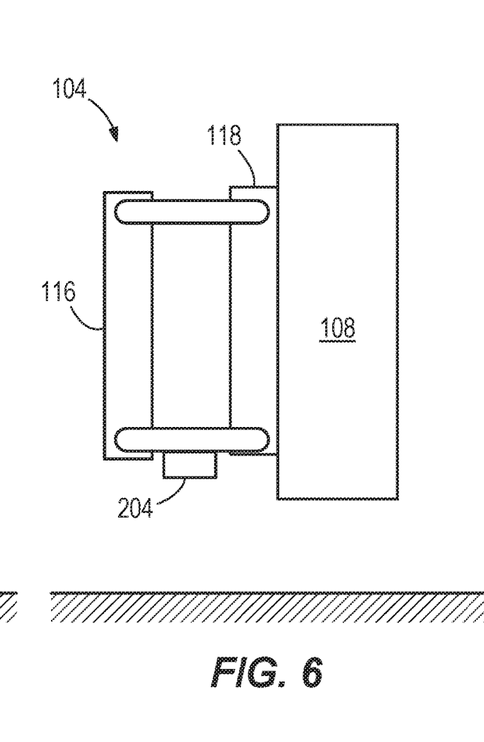
FIG. 6 is a schematic side view of the draper header when lifted off the ground by raising the attachment frame.
Figure 7:
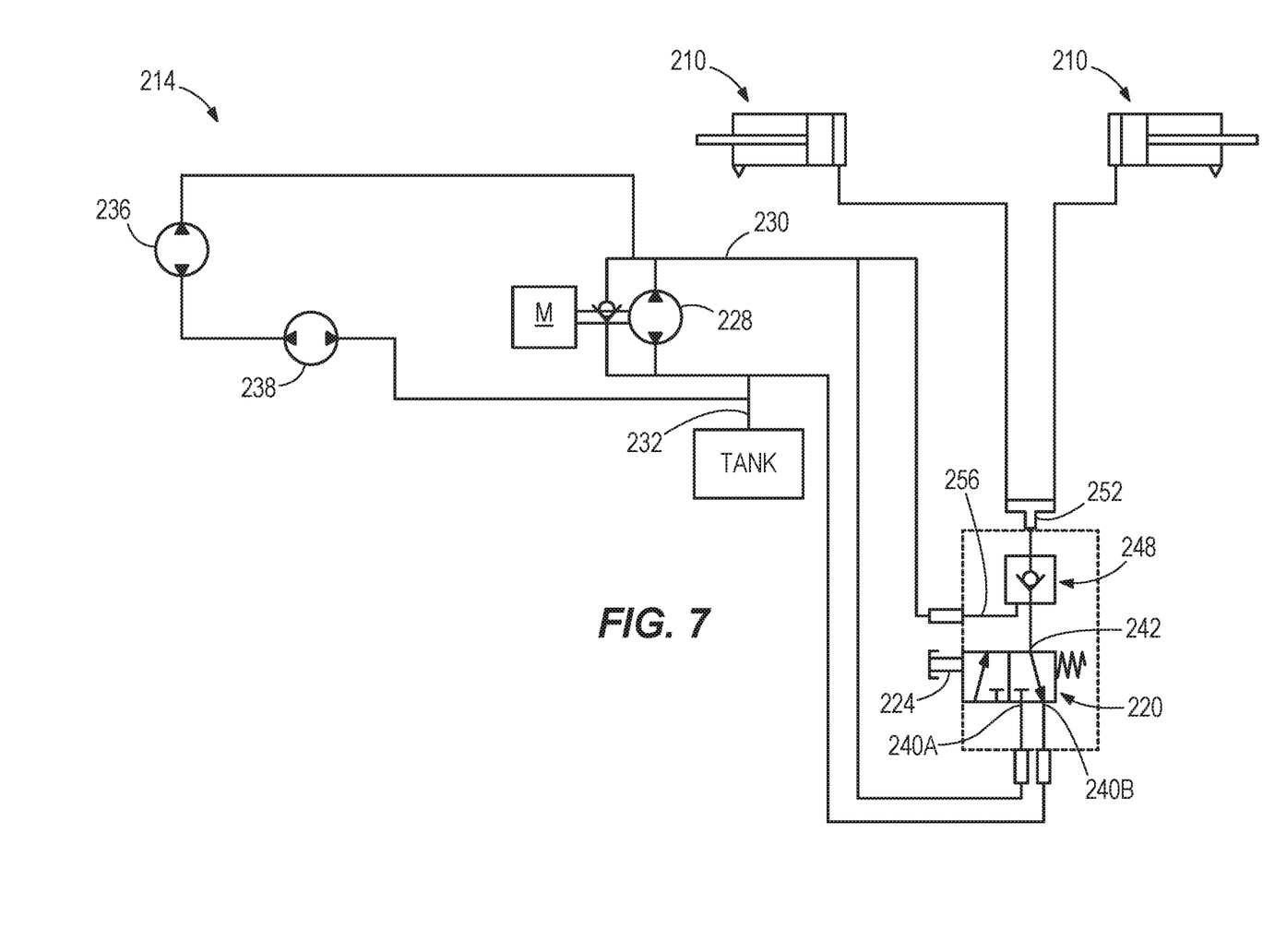
FIG. 7 is a schematic view of a hydraulic circuit including a valve for automatically energizing wing leveling hydraulic cylinders.

With reference to FIG. 7, the hydraulic system 214 includes a valve 220 operable in response to the movement of the header 104 into the lifted state to direct pressurized hydraulic fluid into the leveling actuators 210. The valve 220 can be a proximity valve having an actuator 224 (e.g., a push button actuator) that is positioned to be operated by the action of raising the header 104 to the lifted state as shown in the sequence of FIGS. 5 and 6. The actuator 224 is shown in an exemplary location in FIG. 5. The valve 220 can be a two-position valve, the operation of which is discussed in further detail below. Returning to FIG. 7, the hydraulic system 214 includes a pressure-generating device such as a pump 228 operable by a motor M that can be an electric motor, fuel-burning engine, etc. An inlet side of the pump 228 is coupled to a tank line 232 having relatively low pressure hydraulic fluid, and the pump 228 operates to deliver hydraulic fluid at relatively higher pressure at its outlet side, thus defining a pressure rail 230. The tank line 232 can be in fluid communication with a hydraulic fluid tank provided on the combine 100, e.g., through a hydraulic coupling of the header 104. The hydraulic system 214 further includes first and second hydraulic motors 236, 238 in fluid communication with the pressure rail 230 to be supplied with pressurized hydraulic fluid from the pump 228. The hydraulic motors 236, 238 are mechanically coupled to the side draper belts 128 to drive movement of the same. The hydraulic motors 236, 238 are illustrated as being coupled in series with the first motor 236 discharging to the second motor 238 and the second motor 238 discharging to the tank line 232, but other arrangements are optional, such as parallel circuits driven from one or tandem pumps. It is also noted that the circuit supplied by the pressure rail 230 can include one or more additional valves or operative devices not shown or discussed in detail herein. For example, the circuit supplied by the pressure rail 230 can include one or more hydraulic actuators for any combination of: feeder draper belt drive, reel drive, reel lift, auger drive, auger adjustment, gauge wheel adjustment, etc.

Turning to the right side of the FIG. 7, the valve 220 is shown to include two ports 240A, 240B on a first side thereof, switchably coupled to a port 242 on a second side thereof. For convenience, the two ports 240A, 240B are referred to as inlet side ports, while the port 242 is referred to as an outlet side port. The first inlet side port 240A is coupled to the pressure rail 230 to be in communication with a supply of hydraulic fluid pressurized by the pump 228. The second inlet side port 240B is in communication with the tank line 232. The valve 220 is normally biased to the position shown in which the valve 220 blocks fluid communication between the first inlet side port 240A and the outlet side port 242. Rather, the outlet side port 242 is in fluid communication with the second inlet side port 240B in the normally biased state of the valve 220. The outlet side port 242 is in communication with the respective leveling actuators 210 through a check valve 248 and a flow divider or "T" 252. Although the check valve 248 is configured to prevent backflow from the leveling actuators 210 to the valve 220 when the leveling actuators 210 are energized, thus holding a quantity of pressurized fluid captive in the sub-circuit of the leveling actuators 210, the check valve 248 further is provided with a pilot inlet 256 in connection with the pressure rail 230. Thus, when the valve 220 is not actuated by the lifted state of the header 104, the check valve 248 is opened by the pressure to the pilot inlet 256 so that hydraulic fluid can drain from the leveling actuators 210 through the second inlet side port 240B to the tank line 232. This ensures that the presence of the leveling actuators 210 remains effectively transparent with respect to the normal operation of the header 104 for harvesting in the first mode.

In operation of the combine 100 with the header 104, the operator completes a harvesting cycle and raises the header 104 to the lifted state so that it is spaced off of the ground. This is shown schematically as the transition from FIG. 5 to FIG. 6, and as shown there, lifting the header 104 off the ground causes additional weight of the header 104, initially supported by the ground, to be carried by the attachment frame 118. This in turn results in a downward shift of the center section 116 with respect to the attachment frame 118, thus actuating the proximity valve 220 by contact of a portion of the header 104 with the valve actuator 224 when the stop 204 is engaged to support the center section 116. Prior to the valve actuation, the leveling actuators 210 are inactive, being coupled to the tank line 232 through the valve 220. Upon valve actuation, the outlet side port 242 is put into fluid communication with the pressure rail 230 through the first inlet side port 240A. The pressurized fluid is supplied to the leveling actuators 210 through the check valve 248 and the T 252 so that the leveling actuators 210 are put into the active or ON state. As such, the leveling actuators 210 are fully stroked to their maximum allowable length, which exerts forces F to level the wings 112 with respect to each other and the center section 116. The check valve 248 blocks escape of the pressurized fluid in the lines supplying the leveling actuators 210. Thus, the system will automatically retain the wings 112 in the level condition, with little or no ongoing energy expenditure, as long as the header 104 remains lifted off the ground. This not only provides an improved appearance of the header 104 during times between active harvesting, but also improves ground clearance, especially at the outer extent of the wings 112. The valve 220 effectively defines a normally-dormant, selectively actuable sub-circuit for supplying the leveling actuators 210 by scavenging fluid from the hydraulic circuit with the hydraulic motors 236, 238 that drive the side draper belts 128. Any adverse effect on the operation of the side draper belts 128 is generally momentary, limited in amount, and timed to occur just after completion of a harvesting cycle so that harvesting operations remain unaffected.

Although specifically disclosed herein as a self-contained leveling system including a pair of leveling actuators 210 for respectively leveling a pair of wings 112 with respect to each other and a center section 116 therebetween, it should be understood that in some aspects, the invention may be implemented with at least one leveling actuator provided in accordance with the disclosure herein for leveling at least one section of a combine header with respect to another.

Various features and advantages are set forth in the following claims.

What is claimed is:

1. A draper header for a combine, the draper header comprising:
   an attachment frame adapted for attachment to the combine;
   a harvesting assembly including a plurality of sections and a plurality of belts operable to feed crop material into the combine, the draper header being operable in a first mode that allows the plurality of sections to float relative to the attachment frame for ground following during harvesting, and the draper header being operable in a second mode in which the attachment frame is raised to lift and support the harvesting assembly to be spaced above the ground;
   a hydraulic leveling system including at least one leveling actuator; and
   a valve operable in response to the movement of the draper header into the second mode to direct pressurized hydraulic fluid into the at least one leveling actuator to automatically level the plurality of sections of the harvesting assembly into a planar orientation parallel to the ground when in the second mode.

2. The draper header of claim 1, wherein the plurality of sections of the harvesting assembly includes first and second wings extending in opposite lateral directions from a center section, each of the first and second wings comprising a draper belt operable to feed crop material toward the center section and the center section operable to feed crop material into the combine.

3. The draper header of claim 2, wherein each draper belt is operable by a respective hydraulic motor coupled to a pressure rail supplied with pressurized hydraulic fluid from a pump.

4. The draper header of claim 3, wherein the valve is opened upon transition to the second mode to connect the at least one leveling actuator with the pressure rail.

5. The draper header of claim 4, wherein the at least one leveling actuator includes a first leveling actuator operable to level the first wing with respect to the center section, and a second leveling actuator operable to level the second wing with respect to the center section.

6. The draper header of claim 5, wherein each of the first and second leveling actuators has a full stroke limit that corresponds to the planar orientation.

7. The draper header of claim 1, wherein the at least one leveling actuator has a full stroke limit that corresponds to the planar orientation.

8. The draper header of claim 1, wherein the valve includes a push button actuator positioned to be actuated for opening the valve in response to the movement of the draper header into the second mode.

9. The draper header of claim 1, further comprising a cutterbar positioned at a forward edge of the draper header across the plurality of sections, the cutterbar operable to cut crop material from the ground.

10. The draper header of claim 1, further comprising a resilient float element operable to resiliently support one of the plurality of sections of the harvesting assembly with respect to another of the plurality of sections of the harvesting assembly in both the first mode and the second mode.

11. The draper header of claim 10, wherein the resilient float element is a hydraulic cylinder that is hydraulically isolated from the hydraulic leveling system.

12. A draper header for a combine, the draper header comprising:
   a center section including an attachment frame adapted for attachment to the combine, the center section operable for feeding crop material in a rearward direction into the combine;
   first and second wings extending in opposite lateral directions from the center section, the first and second wings comprising respective draper belts drivable by respective hydraulic motors and operable to feed crop material toward the center section, wherein each of the first and second wings is independently supported relative to the center section by a resilient float element;
   first and second wing leveling hydraulic cylinders coupled, respectively, to the first and second wings and operable when energized to exert respective lifting forces to the first and second wings for leveling the first and second wings;

a cutterbar positioned at a forward edge of the draper header across the center section and the first and second wings, the cutterbar operable to reciprocate for cutting crop material from the ground; and a hydraulic circuit including a pump having an outlet side operatively coupled to the respective hydraulic motors for driving the respective draper belts when the first and second wings engage the ground for harvesting, wherein a valve of the hydraulic circuit is actuable from a first position to a second position, in response to lifting of the first and second wings off the ground, to connect the first and second wing leveling hydraulic cylinders to the outlet side of the pump.

13. The draper header of claim 12, wherein the resilient float elements supporting the first and second wings are passive elements only operable to provide lifting forces insufficient for leveling the first and second wings.

14. The draper header of claim 13, wherein the resilient float elements are hydraulic cylinders separate from the hydraulic circuit.

15. The draper header of claim 12, wherein the center section is supported by a stop on the attachment frame when the first and second wings are lifted off the ground, and wherein the valve includes a push button actuator actuable to drive the valve to the second position in response to the center section coming into contact with the stop on the attachment frame.

16. The draper header of claim 15, wherein each of the first and second wing leveling hydraulic cylinders has a full stroke limit that corresponds to a level condition for the first and second wings.

17. The draper header of claim 12, wherein the hydraulic circuit includes a tank line coupled to an inlet side of the pump, wherein the first and second wing leveling hydraulic cylinders are open to the tank line through the valve when the valve is in the first position, thus rendering the first and second wing leveling hydraulic cylinders inactive.

18. A method of leveling first and second wings of a harvesting assembly of a draper header on a combine, the method comprising:

operating the combine with the draper header on the ground and the first and second wings resiliently supported from a center section of the harvesting assembly;

operating the combine to achieve a lifted state of the draper header by lifting the center section off the ground to remove ground support from the first and second wings so that the center section is supported by a stop on an attachment frame that secures the combine draper header to the combine, leaving the first and second wings independently cantilevered from the center section; and automatically energizing first and second wing leveling actuators, each operating to exert a lifting force to the respective one of the first and second wings to obtain and maintain a level orientation of both the first and second wings in the lifted state.

19. The method of claim 18, wherein each of the first and second wing leveling actuators is actuated to a full stroke limit to obtain the level orientation.

20. The method of claim 18, wherein each of the first and second wing leveling actuators is a hydraulic cylinder, and wherein energizing the first and second wing leveling actuators includes scavenging hydraulic fluid through a switched valve from a hydraulic circuit that drives draper belts of the first and second wings with hydraulic motors from a pump.

* * * * *